(No Model.)

H. W. LEONARD.
DEVICE FOR CONTROLLING THE CURRENTS OF ELECTRIC GENERATORS.

No. 435,700. Patented Sept. 2, 1890.

WITNESSES

INVENTOR
Harry Ward Leonard
By Francis W. Parker
Attorney

UNITED STATES PATENT OFFICE.

HARRY WARD LEONARD, OF CHICAGO, ILLINOIS.

DEVICE FOR CONTROLLING THE CURRENT OF ELECTRIC GENERATORS.

SPECIFICATION forming part of Letters Patent No. 435,700, dated September 2, 1890.

Application filed March 13, 1889. Serial No. 303,079. (No model.)

*To all whom it may concern:*

Be it known that I, HARRY WARD LEONARD, a citizen of the United States, residing at Chicago, in the county of Cook and State of Illinois, have invented a new and useful Improvement in Systems of Electrical Distribution, of which the following is a specification.

The invention relates to a system employing, in combination, a secondary or storage battery, an electric motor connected therewith, an auxiliary generator, and suitable translating device, to electrical systems in which translating devices are connected in multiple arc between the main conductors leading from a suitable source of electricity located at any point, as at the central station of a lighting system, and in which system two generators, as a secondary battery and an auxiliary dynamo or magneto-electric machine, are connected in a multiple-arc branch from the same main circuit; but certain features of the invention are applicable to other arrangements of circuits, as will be apparent.

Figure 1:
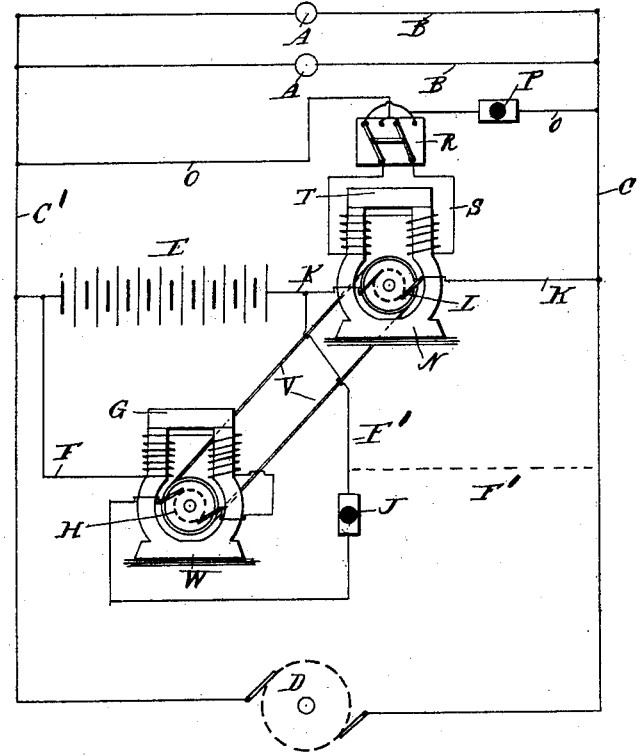
Figure 2:
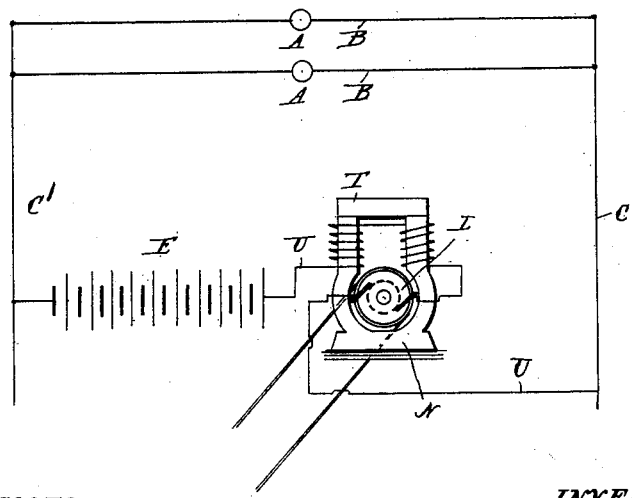

In the accompanying drawings, which illustrate the invention, Figure 1 is a diagrammatic view of an entire system embodying the invention, and Fig. 2 shows a modification of some of the circuit-connections.

A A are translating devices—as, for instance, lamps or motors, of which there may be any desired number—connected in the conductors B B, between the main conductors C′ C, which are supplied with current from the generator D.

E is a storage-battery, also coupled between the conductors C′ C, in an independent branch.

Referring to Fig. 1, F is a conductor leading from the secondary battery E through the field-magnet coil of a motor G, and thence through the armature H. Conductor F′ extends from the armature through resistance J to a conductor K, leading to the other terminal of the secondary battery. The motor G, driven by the secondary battery E, and the generator N, driven by the motor, constitute a continuous-current converter. This conductor K passes through the armature L of the auxiliary generator N, and thence to the main conductor C. As indicated in dotted lines, the conductor F′ might lead direct from the resistance-box to the conductor C, and it will be evident that the connection of wire F′ to the circuit might be otherwise varied without departing from the invention.

O is a conductor leading from the main conductor C to the other, containing the resistance-box P. A four-point or other switch R is placed as shown, by which the circuit S, including the coil of the field-magnet T of the generator N may be connected with the conductor O in such manner as to shunt the current in either direction through said field-magnet coil, and hence to reverse the polarity of the generator. Any other method may be used for reversing the polarity of the auxiliary generator relative to that of the storage-battery.

Referring to Fig. 2, it will be seen that the conductor O O is omitted, while a conductor U leads from one end of the secondary battery through the coil of the field-magnet T of the generator N, thence through the armature L to the conductor C. Any suitable arrangement of circuits for reversing the generators may be used.

V is a belt by which the armature of the generator N may be driven, and this belt may be driven from the motor W. (See Fig. 1.) The dynamo-generators and the motor may be either shunt, series, or compound wound or magneto machines. The manner of connecting the various translating devices in the main circuit is not material. The motor W and generator N could conveniently be combined together in the form of what is known as a "motor-generator," if desired.

The operation of the system above described is as follows: The generator D being in operation, a current will be supplied from the main circuit to the translating devices and also to the secondary battery E through the auxiliary generator N, the generators E and N being coupled in series with each other and in multiple arc with the translating devices, and the current through the storage-battery will depend for its direction and amount upon the electro-motive force of the main circuit, the electro-motive force of the battery, the electro-motive force of the auxiliary generator, and the resistance of the battery-circuit. If the electro-motive force of the main circuit be not high enough to send as strong a current as is desired for charging the secondary battery, the auxiliary generator N may be operated so that its electro-motive force is added to that of the main circuit in overcoming the electro-motive force of the secondary battery, and an increased current through the secondary battery will result. Similarly the auxiliary generator may be operated so that its electro-motive force will be added to that of the secondary battery and opposed to that of the main circuit, which will reduce the current through the battery.

When the main generator is not in use, the electro-motive force upon the translating device may be made anything desired within limits by adding to or opposing the electro-motive force of the secondary battery by means of the electro-motive force of the auxiliary generator, which can be varied or reversed at will.

To illustrate the application of the invention, let it be supposed that A A are incandescent lamps operated by one hundred volts by generator D, and that the electro-motive force upon these lamps must be kept constant. Suppose the battery to be partially charged and its electro-motive force to be ninety volts. If, now, generator N is at rest, we have a charging-current due to ten volts acting through the resistance of the secondary battery. If under these circumstances the charging-current be too great, generator N may be so operated as to produce an opposing electro-motive force to that of the main circuit—that is, an electro-motive force additional to that of a secondary battery—until the current is reduced to the amount desired. If, however, the charging-current be insufficient, the generator N may be operated so as to aid the electro-motive force of the main line, and thus send an increased current through the secondary battery.

It is to be noted that by means of my invention a secondary battery of a certain number of cells may be made valuable in delivering an effectual electro-motive force far less or far greater than the normal electro-motive force of the battery. This is of importance when a greatly increased or diminished electro-motive force is wanted at times, as in street-car work, when greatly-increased power is required for a short while for ascending a grade or going around a curve. When called upon for large currents, as in such cases, a storage-battery falls off in electro-motive force, and since the power varies as the square of the electro-motive force this is a very serious matter.

By means of my invention the electro-motive force supplied by a secondary battery to a street-car motor may be greatly increased when increased power is desired, and any desired amount of current supplied to the motor under any conditions of speed. This will make it possible to greatly lighten the weight of a storage-battery car and increase the efficiency of a street-car motor.

The large number of cells of storage-battery necessary when high electro-motive force is required, even though the energy be small, is a great objection to their use in plants of, say, five hundred volts to five thousand volts. The reliability afforded by a storage-battery plant, even though only sufficient to operate the plant a short time, is very important, but the space, depreciation, chance of trouble and expense in a plant having a large number of cells—say two thousand five hundred—would make their use impracticable. By my invention a small number of cells—say fifty—could be made to serve as a means of supplying the current to the high generator-circuit while charged in the cells held out.

I do not limit myself to any particular application or use of the circuits and apparatus herein described, but the following is given as an illustration of the utility of the system. Suppose that the generator is supplying a circuit with one thousand translating devices, all of which are used up to a certain hour of the day or night, and at that hour a large portion of them are thrown out of use. In such a case it is desirable to allow generator D and the steam-engines used to drive it to stop and yet to keep a proper electro-motive force upon those translating devices left in circuit. The system described is adapted to furnish such electro-motive force and regulate the same in a much better way than can be done at present.

Having thus described my invention, what I claim is—

1. The combination, with a source of electricity, a circuit leading therefrom, and translating devices, of a branch containing a secondary battery and an auxiliary generator, and an electric motor connected with the secondary battery and operatively connected to the auxiliary generator, substantially as described.

2. The combination, with a source of electricity, a circuit leading therefrom, and translating devices, of a branch containing a secondary battery and an auxiliary generator, means for reversing the polarity of the auxiliary generator, and a motor connected with the secondary battery and operatively connected to the auxiliary generator, substantially as described.

3. The combination, with a source of electricity and a circuit leading therefrom, of a branch containing two generators in series, and means for driving one of said generators by power derived from the other generator, substantially as described.

4. The combination, with a source of electricity and a circuit leading therefrom, of a branch containing two generators in series, means for driving one of said generators by power derived from the other, and means for reversing the driven generator, substantially as described.

5. The combination of a source of electricity and a circuit leading therefrom, a branch containing a secondary battery and a dynamo in series, a motor connected with the secondary battery or circuit and means for driving said dynamo by said motor in a direction to generate an electro-motive force counter to the main charging-current, and means for reversing the polarity of the current generated by said dynamo, substantially as described.

6. The combination, with a storage-battery, of a continuous-current converter, the primary circuit thereof being connected with and receiving electrical energy from the secondary battery, and the secondary circuit of said converter being in series with the secondary battery, substantially as described.

7. The combination of a storage-battery, a motor connected therewith, and an auxiliary generator driven by said motor, substantially as described.

8. The combination of a storage-battery connected with a translating-circuit, a motor connected with said battery, and a generator driven by said motor and connected to the translating-circuit, substantially as described.

9. The combination of a storage-battery, a motor connected therewith, and a generator in series with the storage-battery and driven by said motor, substantially as described.

HARRY WARD LEONARD.

Witnesses:
FRANCES W. PARKER,
CARRIE A. LONGFELLOW.